March 27, 1928.

C. O. GUERNSEY

REVERSING MECHANISM

Filed May 4, 1925

Inventor.—
Charles O. Guernsey,
by his Attorneys,
Howson & Howson

March 27, 1928.

C. O. GUERNSEY

REVERSING MECHANISM

Filed May 4, 1925

Inventor-Charles O. Guernsey,
by his Attorneys.-
Howson & Howson.

March 27, 1928.
C. O. GUERNSEY
REVERSING MECHANISM
Filed May 4, 1925
1,664,209
3 Sheets-Sheet 3
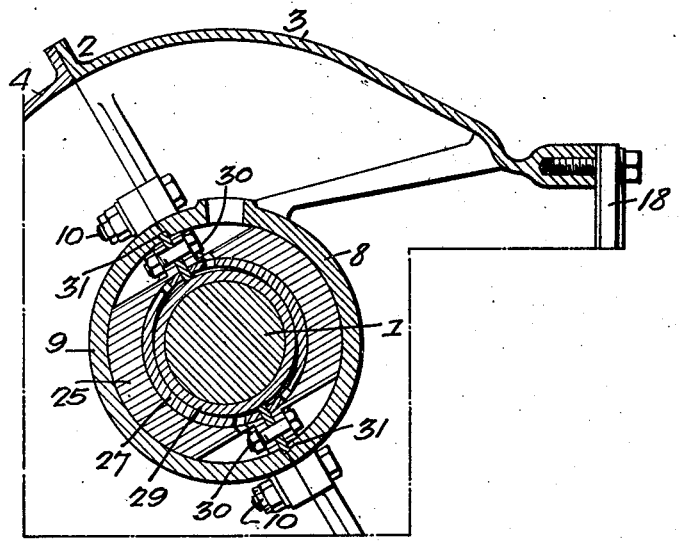
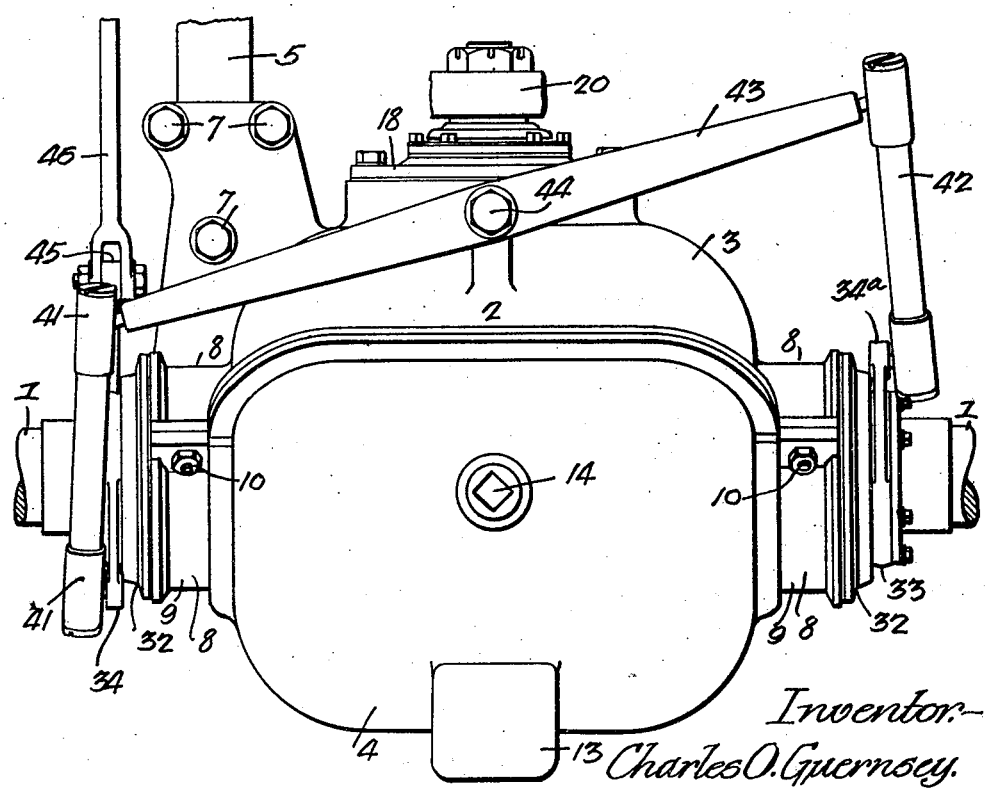
Inventor:-
Charles O. Guernsey.
by his Attorneys.-
Howson & Howson Patented Mar. 27, 1928.

1,664,209

UNITED STATES PATENT OFFICE.

CHARLES O. GUERNSEY, OF PHILADELPHIA, PENNSYLVANIA.

REVERSING MECHANISM.

Application filed May 4, 1925. Serial No. 27,908.

A reversing mechanism embodying the invention is specially applicable for use on railway cars or coaches in which power is transmitted from a transmission mechanism on the car truck to one or to both of the coach axles. In a coach of this type it is desirable to mount the reversing mechanism directly on the axle so that the transmission mechanism may always rotate in the same direction.

More particularly, the invention relates to a reversing mechanism of the bevel gear type in which the driven gears are shifted axially into and out of mesh with the driving pinion. The principal object of the invention is to provide a simple and improved means whereby the adjustment or shifting of the driven gears may be effected. Further objects of the invention will be apparent from the following specification and claims.

In the accompanying drawings I have shown the embodiment of the invention which I now deem preferable but it will be understood that the drawings are for illustrative purposes only and that various changes and substitutions may be made within the scope of the claims without departing from the spirit of the invention.

Of the drawings:

Fig. 3 is a fragmentary vertical sectional view taken along the line 3—3 of Fig. 1.

Fig. 5 is a bottom view showing the operating linkage.

Figure 1:
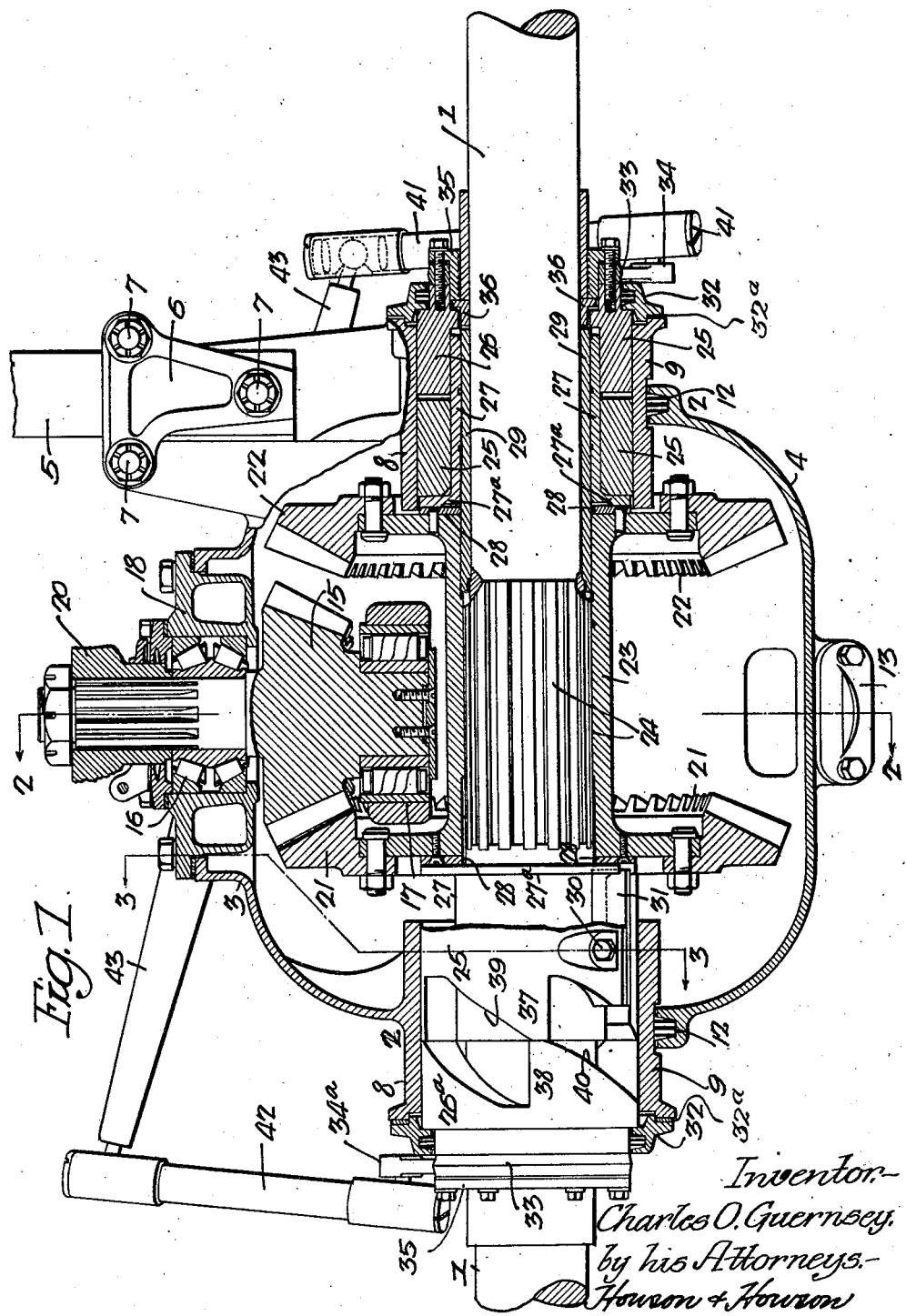
Fig. 1 is a horizontal sectional view through a reversing mechanism embodying the invention.
Figure 2:
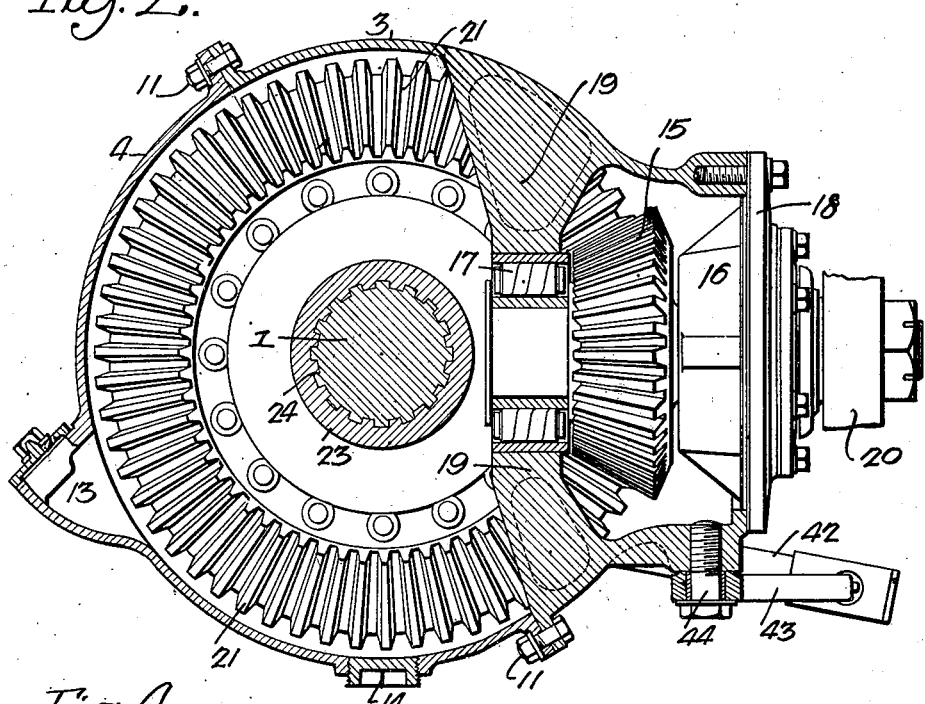
Fig. 2 is a vertical sectional view taken along the line 2—2 of Fig. 1.

Referring particularly to Fig. 1 of the drawings, 1 represents a driven shaft, which may be the axle of a coach truck. In the case of an axle it will be understood that coach wheels are mounted at the ends thereof and that the axle is engaged by suitable bearings which support the frame of the coach. Inasmuch as these parts are not involved in the present invention, they are not shown.

Supported on the driven shaft or axle 1 is a housing 2 which preferably comprises upper and lower sections 3 and 4. A suitable strut is provided for preventing the housing from turning on the shaft or axle and as illustrated this is in the form of a leaf spring 5. This spring is engaged by a clamping plate 6 held in place by bolts 7.

The casing is provided with bearing surfaces at 8, 8, which are concentric with the shaft 1 but separated therefrom for a purpose to be described. These bearing surfaces 8, 8 are partly on the upper section 3 of the housing and partly on caps 9, 9 secured to the upper section by means of bolts 10, 10. The lower section 4 of the housing is readily detachable from the upper section to provide access to the interior and it is held in place by bolts 11, 11. The lower section 4 is cut away to provide room for the caps 9, 9 and packing is provided in grooves at 12, 12 to prevent the escape of oil through the spaces between the lower section and the bearing caps. An opening is provided at 13 for pouring oil into the casing and a drain plug is provided at 14.

Mounted in the casing for rotation about an axis which is at angle, usually a right angle, to the driven shaft, is a driving shaft carrying a bevel pinion 15. Preferably as shown the bevel gear 15 and the shaft are formed integrally and the shaft is mounted in bearings 16 and 17. As illustrated the bearing 16 is of the tapered roller type and is carried by a plate 18 which covers an opening in the housing. The bearing 17 is of the straight roller type and is mounted in a vertically extending rib 19 formed integrally with the upper section 3 of the housing. 20 is a suitable drive member secured to the end of the bevel gear shaft, and this may, for instance, be one element of a universal joint.

Slidably mounted on the shaft 1 within the housing is a gear unit comprising two connected bevel gears 21 and 22, each adapted to mesh with the bevel pinion 15. These two gears are rigidly connected together and preferably they are bolted to flanges formed on a slidable sleeve 23. As illustrated the shaft 1 and the sleeve 23 are both formed at 24 with integral teeth or keys extending longitudinally and adapted to engage with each other to permit longitudinal sliding of the sleeve and to prevent relative rotative movement. As shown in Fig. 1, the gear 21 is in mesh with the pinion 15 and with the parts so positioned power will be transmitted from the driver 20 to rotate the shaft 1 in one direction. It will be obvious that by sliding the sleeve 23 the gear 21 can be moved out of mesh and the gear 22 moved into mesh. With the parts in this second position power will be transmitted from the driver 20 to rotate the shaft 1 in the other direction.

In accordance with my invention novel devices are provided for shifting the sleeve 23 together with the gears 21 and 22. Cam means are provided at each end of the gear unit for moving the unit axially, and preferably these cam devices are rotatable about the axis of the driven shaft. As shown there are interposed between each bearing surface 8 of the housing and the corresponding part of the driven shaft two annular members or rings 25 and 26. The construction at the right hand end will be described but it will be understood that the construction at the left hand end is similar except for the reversal of parts. The outer surfaces of the rings 25 and 26 contact directly with bearing surface 8 of the housing and the rings also serve as bearing members for the shaft 1. Preferably for this purpose the inner surfaces of the rings engage a bearing bushing 27 which is preferably provided with a flange 27$^a$ at the inner end. This flange 27$^a$ is adapted to engage a bearing washer 28 secured to the end of the sleeve 23. Preferably a bushing 29 is interposed between the sleeve 27 and the axle, this being provided for structural reasons to permit the assembly of the various parts.

The ring 25 is held against rotative movement but is movable endwise. The preferred means for holding this ring is shown in Fig. 3. As illustrated the ring is made in two parts held together by bolts 30, 30. Clamped between the two parts of the ring are key plates 31, 31 which extend outward into longitudinal slots in the housing. The bearing sleeve 27 is preferably also formed in two parts and the said key plates 31, 31 extend inward between the two parts of the said sleeve. This construction not only serves to prevent the ring 25 from turning but it also prevents the bearing bushing from turning.

Figure 4:
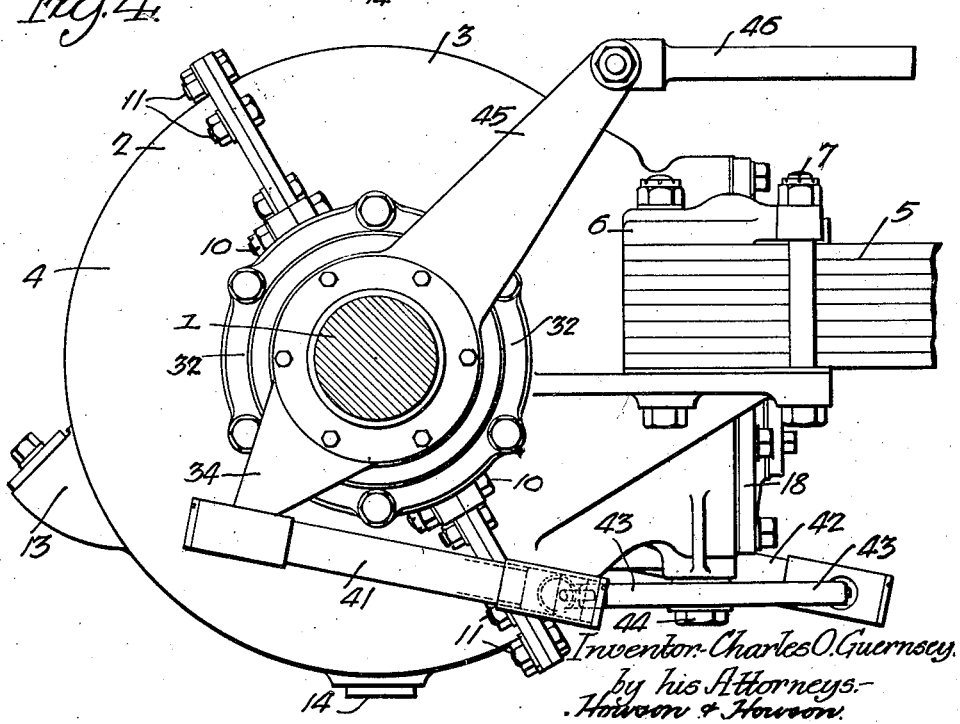
Fig. 4 is a right hand end view.

The ring 26 constitutes a cam and it is preferably formed in one piece and is rotatable to a limited extent between the bearing surface 8 of the housing and the outer surface of the bearing sleeve 27. This ring is held against outward axial movement by means of a ring 32 which is secured to the housing. Connected with the outer end of the cam ring 26 is a ring 33 which carries an operating lever 34 as shown in Fig. 4. Also connected with the end of the ring 26 and adjacent the ring 33 is a bushing 35. This bushing is adapted to engage a ring 36 on the shaft 1, and it thus serves to prevent or at least limit inward axial movement of the ring 26.

The non-rotatable ring 25 and the cam ring 26 are provided with mating cam surfaces, and preferably there are interengaging teeth 37 and 38 provided with flat tops and having cam surfaces 39 and 40. The construction is such that when the ring 26 is turned by the lever 34 the ring 25 will be moved endwise carrying the sleeve 23 and the gears 21 and 22 with it. The proportions of the cam teeth are such that when the teeth at the right hand side are fully interengaged as shown in Fig. 1, the gear 21 will be in proper mesh with the pinion 15. When the cam ring 26 at the right hand side has been moved so that the tops of the teeth are in contact, the gear 22 will be in proper mesh with the pinion 15. In order that the ring 26 may be adjusted axially in order to insure the proper mesh between the gear and the pinion, I prefer to provide one or more shims 32$^a$ between the ring 32 and the housing. By removing the shim, or by replacing it with another, the position of the ring can be adjusted axially so as to properly control the meshing of the gear and pinion.

It will be understood that a construction similar to that already described in detail is provided at the left hand end of the casing and that the two rotatable cams are connected for movement in proper timed relation. As shown the tops of the teeth 37 and 38 at the left are in engagement and the gear 21 is thus held in proper engagement with the pinion. By rotating the left hand cam 26$^a$ in the clockwise direction (as viewed from the right) and by rotating the cam 26 in the counter-clockwise direction, the sleeve 23 will be moved to bring the gear 21 out of mesh and the gear 22 into mesh. It will be noted that the spaces between the bottoms of the cam teeth are wider than the tops of the mating teeth. This permits one of the cams 26 or 26$^a$, in this case the left hand cam 26$^a$, to move far enough to release the teeth on the corresponding ring 25$^a$ before the ring 25 at the right starts to move axially.

As shown in Figs. 4 and 5, the operating levers 34 and 34$^a$ for the two cam rings 26 and 26$^a$ are connected by means of links 41 and 42 with a lever 43 which is pivoted to the casing for movement about a vertical pivot at 44. Any suitable mechanism may be provided for operating the levers and links as described. I have shown an arm 45 projecting from one of the rings 33 and connected with a reach rod 46. It will be understood that this reach rod is connected with any suitable mechanism for adjusting or shifting the reversing mechanism.

What I claim is:

1. A reversing mechanism comprising in combination a driving shaft and a driven shaft at an angle to each other; a bevel pinion on the driving shaft; a gear unit on the driven shaft comprising a sleeve and two bevel gears carried thereby, the said unit being axially movable to bring either of the gears into mesh with the pinion and the other out of mesh; two axially movable non-rotatable rings located at the respective ends of the gear unit and adapted to determine the longitudinal position thereof, the said rings having at their outer ends cam teeth with flat tops and having flat surfaces between the teeth at the bottom thereof; two cam rings rotatable about the axis of the driven shaft and having cam teeth adapted to engage respectively with the cam teeth on the non-rotatable rings, the teeth of the cam rings also having flat tops and the rings having flat surfaces between the teeth at the bottoms thereof; and means whereby the said cam rings may be adjusted axially.

2. A reversing mechanism comprising in combination a driving shaft and a driven shaft at an angle to each other; a bevel pinion on the driving shaft; a gear unit on the driven shaft comprising a sleeve and two bevel gears carried thereby; the said unit being axially movable to bring either of the gears into mesh with the pinion and the other out of mesh; two axially movable non-rotatable rings located at the respective ends of the gear unit and adapted to determine the longitudinal position thereof, the said rings having at their outer ends cam teeth with flat tops and having flat surfaces between the teeth at the bottoms thereof; two cam rings rotatable about the axis of the driven shaft and having cam teeth adapted to engage respectively with the cam teeth on the non-rotatable rings, the teeth of the cam rings also having flat tops and the rings having flat surfaces between the teeth at the bottoms thereof; and means including removable shims whereby the said cam rings may be adjusted axially.

3. A reversing mechanism comprising in combination a driving shaft and a driven shaft at an angle to each other; a bevel pinion on the driving shaft; a gear unit on the driven shaft comprising a sleeve and two bevel gears carried thereby, the said unit being axially movable to bring either of the gears into mesh with the pinion and the other out of mesh; two axially movable non-rotatable rings located at the respective ends of the gear unit and adapted to determine the longitudinal position thereof, the said rings having cam faces at their outer ends; two cam rings rotatable about the axis of the driven shaft having cam faces respectively adapted to engage the cam faces of the non-rotatable rings; and a housing enclosing the said gears and having bearing engagement with the outer surfaces of the aforesaid rings independently of the driven shaft.

4. A reversing mechanism comprising in combination a driving shaft and a driven shaft at an angle to each other; a bevel pinion on the driving shaft; a gear unit on the driven shaft comprising a sleeve and two bevel gears carried thereby, the said unit being axially movable to bring either of the gears into mesh with the pinion and the other out of mesh; two axially movable non-rotatable rings located at the respective ends of the gear unit and adapted to determine the longitudinal position thereof, the said rings having cam faces at their outer ends; two cam rings rotatable about the axis of the driven shaft having cam faces respectively adapted to engage the cam faces of the non-rotatable rings; a housing enclosing the said gears and having bearing engagement with the outer surfaces of the aforesaid rings independently of the driven shaft; means engaging the housing for preventing the rotation of the first said rings; and means extending outside of the housing for turning the second said rings.

5. A reversing mechanism comprising in combination a driving shaft and a driven shaft at an angle to each other; a bevel pinion on the driving shaft; a gear unit on the driven shaft comprising a sleeve and two bevel gears carried thereby, the said unit being axially movable to bring either of the gears into mesh with the pinion and the other out of mesh; two axially movable non-rotatable rings located at the respective ends of the gear unit and adapted to determine the longitudinal position thereof, the said rings having cam faces at their outer ends; two cam rings rotatable about the axis of the driven shaft having cam faces respectively adapted to engage the cam faces of the non-rotatable rings; a housing enclosing the said gears and having bearing engagement with the outer surfaces of the aforesaid rings independently of the driven shaft; means engaging the housing for preventing the rotation of the first said rings; and means including levers secured to the respective outer ends of the cam rings outside of the housing for turning the said cam rings.

6. A reversing mechanism comprising in combination a driving shaft and a driven shaft at an angle to each other; a bevel pinion on the driving shaft; a gear unit on the driven shaft comprising a sleeve and two bevel gears carried thereby, the said unit being axially movable to bring either of the gears into mesh with the pinion and the other out of mesh; two axially movable non-rotatable rings located at the respective ends of the gear unit and adapted to determine the longitudinal position thereof, the said rings having cam faces at their outer ends and being each formed in two parts separated along an axial plane; two cam rings rotatable about the axis of the driven shaft having cam faces respectively adapted to engage the cam faces of the non-rotatable rings; a housing enclosing the said gears and having bearing engagement with the outer surfaces of the aforesaid rings independently of the driven shaft; means held between the two parts of the respective axially movable rings for engaging the housing to prevent rotation of said rings; and means for turning the second said rings.

CHARLES O. GUERNSEY.